United States Patent [19]
Varon

[11] Patent Number: 6,081,764
[45] Date of Patent: Jun. 27, 2000

[54] AIR TRAFFIC CONTROL SYSTEM

[75] Inventor: Dan Varon, Needham, Mass.

[73] Assignee: Raytheon Company, Lexington, Mass.

[21] Appl. No.: 08/990,893

[22] Filed: Dec. 15, 1997

[51] Int. Cl.$^7$ .................................................. G06F 15/00
[52] U.S. Cl. .................. 701/120; 701/122; 701/300; 342/29; 342/32; 342/36; 342/46; 342/73; 342/350; 342/455; 342/456
[58] Field of Search .................... 701/120, 122, 701/300, 301, 302, 7; 342/29, 30, 32, 36, 90, 95, 42, 350, 455, 456, 46, 73

[56] References Cited

U.S. PATENT DOCUMENTS

| | | | |
|---|---|---|---|
| 4,827,418 | 5/1989 | Gerstenfeld | 364/439 |
| 4,970,518 | 11/1990 | Cole, Jr. | 342/37 |
| 4,979,137 | 12/1990 | Gerstenfeld et al. | 364/578 |
| 5,181,027 | 1/1993 | Shafer | 340/961 |

OTHER PUBLICATIONS

Book entitled: "Multiple–Target Tracking with Radar Applications", by Samuel S. Blackman, publisher: Artech House, Dedham, MA, copyright 1986, information found in Chapter 4 entitled: "Gating and Data Association", pp. 83–113 (first page unnumbered)., Month Unknown.

*Primary Examiner*—William A. Cuchlinski, Jr.
*Assistant Examiner*—Yonel Beaulieu
*Attorney, Agent, or Firm*—Daly, Crowley & Mofford, LLP

[57] ABSTRACT

An apparatus and techniques for correlating crossing targets in an air traffic control system is described. The technique utilizes a target/track correlation made on the basis of three conditions: (1) separation distance between a target pair; (2) target polarity and (3) a value of a threshold separation value indicator.

30 Claims, 10 Drawing Sheets

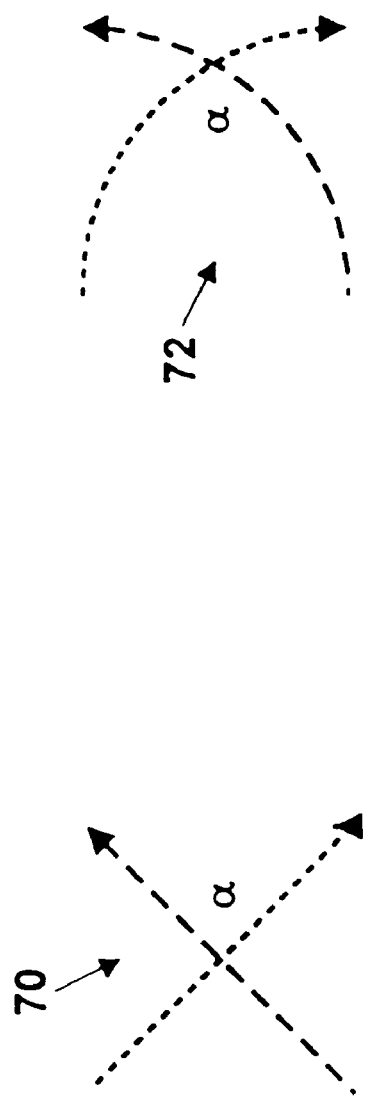
Figure 1C
Figure 1D
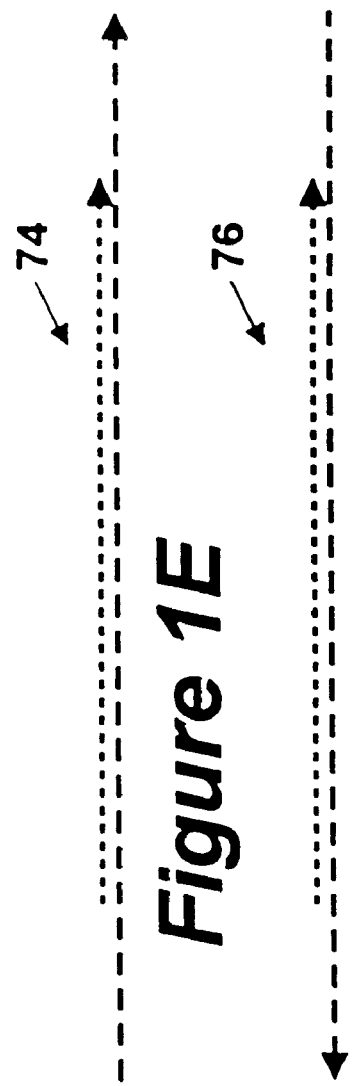
Figure 1E
Figure 1F

AIR TRAFFIC CONTROL SYSTEM

GOVERNMENT RIGHTS

Not applicable.

RELATED APPLICATIONS

Not applicable.

FIELD OF THE INVENTION

This invention relates generally to air traffic control systems and more particularly to a method and apparatus for tracking crossing targets detected by air traffic control systems.

BACKGROUND OF THE INVENTION

As is known in the art, air traffic control is a service to promote the safe, orderly, and expeditious flow of air traffic. Safety is principally a matter of preventing collisions with other aircraft, obstructions, and the ground; assisting aircraft in avoiding hazardous weather; assuring that aircraft do not operate in airspace where operations are prohibited; and assisting aircraft in distress. Orderly and expeditious flow assures the efficiency of aircraft operations along the routes selected by the operator. It is provided through the equitable allocation of system resources to individual flights, generally on a first-come-first-served basis.

As is also known, air traffic control services are provided by air traffic control systems. Air traffic control systems are a type of computer and display system that processes data received from air surveillance radar systems for the detection and tracking of aircraft. Air traffic control systems are used for both civilian and military applications to determine the identity and locations of aircraft in a particular geographic area. Such detection and tracking is necessary to notify aircraft flying in proximity of each other and to warn aircraft which appear to be on a collision course. This is particularly true around airports where a relatively large number of aircraft fly in a relatively small geographic area. It is also desirable to track aircraft to determine and verify that particular aircraft are travelling along particular routes. In this manner it is possible to reduce collisions between aircraft. Air traffic control systems thus generally provide information on aircraft in the vicinity of airports from data provided by air-surveillance radars, as well as information on aircraft travelling between airports from data provided by air-route surveillance radars.

Air-traffic controller systems use one or more radar systems to monitor the positions of aircraft in their sectors of responsibility and to monitor areas of heavy precipitation. Each of the radar systems typically include an antenna, a transmitter and a receiver. The radar information is used to develop clearances and instructions for separating aircraft operating on flight plans under instrument flight rules, and to provide traffic advisories to instrument-flight-rules aircraft and to visual-flight-rules aircraft receiving the traffic advisory service. Two principal types of radar are used in civil air-traffic control, secondary, or beacon, radar and primary radar.

A secondary radar refers to an interrogate-respond system. In this type of system, a directional antenna located at a ground station transmits a pulse pair to a transponder in the aircraft. The pulse spacing encodes one of two messages, "transmit your altitude" (the Mode C interrogation) or "transmit your identity" (the Mode 3/A interrogation). The aircraft transponder transmits an encoded pressure-altitude reply in response to the first interrogation and a four-digit identity code, assigned by air-traffic control and entered into the transponder by the pilot, in response to the second. The aircraft is shown on the controller's plan view display at the azimuth corresponding to the pointing direction of the antenna and the range corresponding to the round-trip time between transmission of the interrogation and receipt of the reply. Air-traffic control computers receive the encoded reply data from radar sites and place corresponding information in data blocks next to the symbols depicting the aircraft positions on the display. The identity code assigned by air-traffic control is correlated with the database in the computer of flight plans filed under instrument flight rules to display the radio call sign in the data block. The aircraft pressure altitude is displayed in hundreds of feet.

A primary radar, on the other hand, operates by transmitting a relatively high-power, radio-frequency (RF) pulse from a directional antenna. The energy is reflected from any aircraft in the directional beam and received by the antenna. The aircraft is displayed at the azimuth corresponding to the pointing direction of the antenna and the range corresponding to the round-trip time between pulse transmission and receipt of the reflected signal.

The radar systems are typically coupled to an air traffic control automation (ATCA) system.

Each of the one or more radar systems feeds the target data signals to the ATCA system. The ATCA system often includes multiple processors each of which process the target data signals in a particular manner. Among other things, the ATCA system maintains and updates the target data fed thereto to thus maintain accurately the location and speed of targets detected and tracked by the radar system portion of the air traffic control system. In performing this function, the ATCA system typically assigns a unique identifier or "label" to each target that is being tracked.

In conventional air traffic control systems, new radar reports are correlated with aircraft tracks on the basis of discriminants, such as the above-mentioned discrete beacon codes or Mode C responses. If none of these discriminants exist, correlation of the new radar reports to the aircraft tracks is performed by a nearest neighbor computational technique wherein a target is correlated on the basis of its proximity to its track predicted position. When two targets correlate with two tracks, the distance between each target's reported position and each track's predicted position is calculated.

A correlation is established between the target and track which are separated by the shortest distance, with the remaining target and track forming the other correlation. Unfortunately, this correlation method may produce ambiguous results when a target's distance from one track is the same, within measurement accuracy, as its distance from the other track. Such a situation can occur shortly before and after two targets reach a crossing point, in what is named the crossing region.

In the crossing region, there are times when even discrete beacon codes or Mode C targets may not correlate unambiguously, because beacon codes and Mode C responses may be garbled. In this case, the correlation technique defaults to the nearest neighbor computational technique. Nevertheless, a large crossing region, in which multiple miscorrelations may occur, can lead to track equalization, permanent label swapping, and, ultimately, track loss.

One problem which thus arises when multiple targets are tracked by the air traffic control system is the ability to maintain and update target data on multiple targets which fly in proximity to each other thereby preventing the reliable identification of the individual targets. In this case, the labels of crossing targets can frequently be swapped if the targets have no distinguishable attributes. Such targets are Primary Surveillance Radar (PSR) reports and identical Secondary Surveillance radar (SSR) beacon codes with no reported altitude (Mode C). Label swapping is caused by inherent weaknesses in the nearest neighbor techniques used to correlate new radar reports with established tracks.

When a target and track are correlated on the basis of the distance between them, successful correlation is predicated on the condition that this distance does not exceed a threshold value, known as the radius of the correlation search area. In other words, a target correlates with a track only if it is located inside a search area (gate) of a predetermined radius, centered about the track's predicted position. When two tracks cross, their search areas overlap. If, while they overlap, at least one target is found to be in both areas, a potential for label swap exists. When a nearest neighbor technique is being used, the targets are said to be in an ambiguous correlation region (ACR).

To minimize the ACR, the size of the correlation search area should be minimized. However, the smaller the search area, the higher the potential for track loss when the targets emerge from the ACR, because as a result of miscorrelation-caused track degradation, the distance between each target and its track increases, and the target may no longer fall inside the search area. In practice, if search area size is the only means of controlling the correlation process, prevention of label swaps and track losses are mutually exclusive objectives.

It would, therefore, be desirable to provide a technique which allows an increase of the search area size to prevent track loss without increasing the swap probability. It would also be desirable to provide a system which correlates new radar data with existing aircraft tracks and which minimizes miscorrelations, track equalization, permanent label swapping and target track loss.

SUMMARY OF THE INVENTION

In accordance with the present invention, an apparatus for tracking crossing targets includes means for obtaining the coordinates of a plurality of targets, means for selecting a first target pair from the plurality of targets, means for computing a composite flight path for the first target pair, means for computing a polarity value for the first target pair and means for using the composite flight path and the polarity values to resolve ambiguities in correlating track data with the crossing targets in an ambiguous correlation region. With this particular arrangement, an apparatus for correlating new radar data with existing aircraft tracks and which minimizes miscorrelations, track equalization, permanent label swapping and track loss is provided. The computations of the composite flight path and target polarity values provides an apparatus having additional degrees of freedom thus making it possible to increase the size of the search area to prevent track losses without a corresponding increase in the swap probability. This leads to an apparatus in which the occurrence of label swapping are minimized and in some scenarios completely eliminated.

The computation and utilization of the composite flight path recognizes that when the coordinates of each target are subtracted from the coordinates of the targets' composite flight path, the resultant numbers have opposite signs. In one particular embodiment, the composite flight path corresponds to a mean flight path obtained by averaging the coordinates of the two flight paths. For example, if $T_1$ and $T_2$ are two target aircraft with crossing flight paths, and their ground plane coordinates are $(X_1(t), Y_1(t))$ and $(X_2(t), Y_2(t))$, respectively, their mean flight path is the locus of points $(X_m(t), Y_m(t))$, which may be computed as:

$$X_m(t) = (X_1(t) + X_2(t))/2$$

$$Y_m(t) = (Y_1(t) + Y_2(t))/2$$

It should be noted that other techniques may also be used to compute the locus of points $(X_m(t), Y_m(t))$ which provide the composite flight path. It should also be noted that the difference values computed as $X_m - X_1$ and $X_m - X_2$ should be of opposite signs. Similarly, the difference values computed as $Y_m - Y_1$ and $Y_m - Y_2$ also should be of opposite signs. Referring to these difference values as polarities, the x-polarity of aircraft $T_1$ is defined as positive and that of $T_2$ a negative if the difference $(X_m - Y_1)$ results in a positive number. Similarly, the y-polarity of aircraft $T_1$ is defined as positive if the difference $(Y_m - Y_1)$ is positive, and vice versa. The polarity indicates on which side of the composite flight path the target is located. When a target passes the crossing point, its polarity is reversed. By knowing one target's polarity and whether it has passed the crossing point, it can be uniquely distinguished from the pair's other target.

In accordance with a further aspect of the present invention, a method for tracking crossing targets includes the steps of (a) obtaining the coordinates of a plurality of targets, (b) selecting a first target pair from the plurality of targets, (c) computing a composite flight path for the target pair, (d) computing a polarity value for the target pair and (e) using the composite flight path and the polarity values to resolve ambiguities in correlating new radar data with existing aircraft tracks. With this particular technique, a method for correlating new radar data with existing aircraft tracks which minimizes miscorrelations, track equalization, permanent label swapping and track loss is provided.

It should be noted that the present invention can be used in both commercial and military applications. For example, in military systems, which track non-friendly, unidentifiable aircraft, the techniques of the present invention enhance the correlation performance of such aircraft when they fly in close proximity. Moreover, the technique of the present invention provides a relatively low cost technique which also utilizes fewer computer resources than alternative techniques. The techniques of the present invention are suitable for systems which require that a scenario in which a first target travelling at a speed of 400-knots overtakes a second target travelling at 300-knots will exhibit no swaps in ninety-five Monte Carlo replications of the flight paths.

In accordance with a still further aspect of the present invention, a method for avoiding swaps within the crossing region is provided by utilizing an ambiguous coasting technique. The ambiguous coasting technique of the present invention minimizes or prevents label swaps and sidesteps miscorrelations that can lead to track loss as follows. When the composite flight path technique described above produces an indeterminate result the system suppresses the display of the target pair's plots and, instead, displays the target pairs track positions, tagged by labels showing the aircraft identification labels (IDs) retrieved from a Track Table. The tracks themselves are coasted by extrapolating the track only if both targets fall into the same search area. Otherwise, the tracks are updated, even though the correlation can be incorrect. This technique minimizes the number of consecutive instances in which the tracks are not updated, and thereby prevents the track from veering too far off course. This is of particular importance in certain scenarios which take a long time to traverse the crossing region. For example, when one target overtakes another by only 100 knots, and the search areas are one nautical mile in radius, the areas will overlap for 144 seconds.

BRIEF DESCRIPTION OF THE DRAWINGS

The foregoing features of this invention as well as the invention itself may be more fully understood from the following detailed description of the drawings in which:

FIGS. 1C–1F are a series of plots showing flight paths of crossing targets;

DESCRIPTION OF THE PREFERRED EMBODIMENTS

Figure 1:
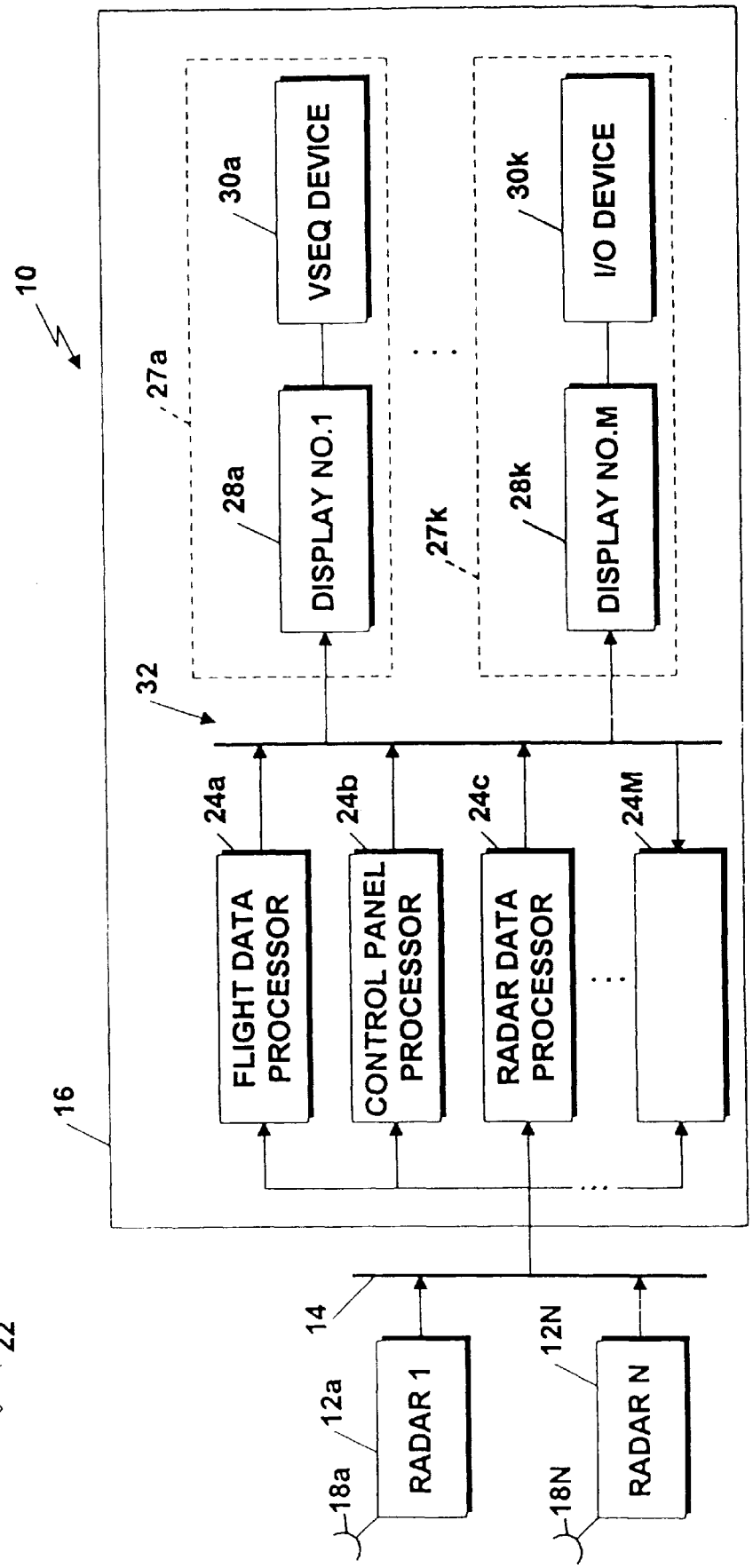
FIG. 1 is a block diagram of an air traffic control system.

Referring now to FIG. 1, in general overview, an air traffic control system 10 includes one or more radar systems 12A–12N generally denoted 12 coupled via a network 14 which may be provided for example, as a local area network, to an air traffic control automation (ACTA) system 16. In the case where multiple radar systems 12 exist, each of the radar systems 12 may be located at different physical locations to provide substantially continuous radar coverage over a geographic area larger than that which could be covered by any single one of the radar systems 12.

In operation, each of the radar systems 12 emit radio frequency (RF) signals into a predetermined spatial region through a corresponding one of antennas 18a–18N as is generally known. Portions of the emitted RF signals intercept targets 20, 22 which may correspond, for example, to aircraft flying in the predetermined spatial region. Those portions of the emitted RF signals which intercept the targets 20, 22 are reflected from the targets 20, 22 as return or target signals which are received by respective ones of the radars 12.

In some cases targets 20, 22 include a transponder, and the RF signal emitted by the radar system 12 includes a so-called interrogation signal. The interrogation signal interrogates the transponder on the target 20, 22 and in response to an appropriate interrogation signal, the transponder transmits the response signal from the target 20, 22 to the respective radar system 12. Thus, first portions of the return or target signal received by the respective ones of the radars 12 may correspond to portions of the RF signal reflected from the targets 20, 22 and second portions of the target signal can correspond to a response signal emitted from the transponder on the target.

Each of the one or more radar systems 12 feeds the target data signals to the ATCA system 16. The ATCA system 16 includes one or more processors 24a–24M each of which perform a particular function as is generally known. Here ATCA system 16 is shown to include a flight data processor 24a for processing flight data plans submitted by aircraft personnel to designate routes, a control panel processor 24b to provide appropriately processed information to be displayed on one or more displays 28a–28K and a radar data processor 24c which process target data signals in a particular manner. Those of ordinary skill in the art will appreciate of course that ATCA system 16 may include additional or fewer processors depending upon the particular application. For example, in some embodiments it may be desirable to utilize a single processor which concurrently or simultaneously performs all the functions to be performed by ATCA system 16.

The processors 24 are coupled over a network 32 to the one or more input/output (I/O) systems 27a–27k generally denoted 27. Taking I/O system 27a as representative of systems 27b–27k, each I/O system 27a includes a processor and any other hardware and software necessary to provide a graphical user interface (GUI). Each I/O system includes a display 28a which can have coupled thereto an input device 30 which may be provided, for example, as a keyboard and a pointing device well known to those of ordinary skill in the art, which interfaces with the graphical user interface (GUI) of the display 28. Those of ordinary skill in the art will appreciate, of course, that other input devices may also be used. The displays 28 may be located at different physical locations.

Among other things, the ATCA system 16 maintains and updates the target data fed thereto to thus maintain the location and speed of targets detected and tracked by the radar system portion of the air traffic control system. In performing this function, the ATCA system typically assigns a unique identifier or "label" to each tracked target.

Air traffic control system 10 periodically generates new radar reports which are correlated with target tracks on the basis of discriminants, such as discrete beacon codes or Mode C. If none of these discriminants exist, then in accordance with the present invention, correlation is performed using a composite flight path correlation technique.

The situation where no discriminants exist commonly occurs shortly before and after a crossing point, in what is referred to as a crossing region. In the crossing region, there are times when even discrete beacon codes of Mode C targets may not correlate unambiguously, because beacon codes and Mode C may be garbled, and the correlation algorithm utilizes the composite flight path technique to correlate radar reports with target tracks.

Air traffic control system 10 tracks a plurality of targets with two targets 20, 22 here being shown for simplicity and ease of description. The two targets 20, 22 flying in proximity to each other form a target pair 23 thereby preventing the reliable identification of the individual targets 20, 22 by the ATCA system 16. In this case, the composite flight path processing steps executed by RD processor 24c reduces and in some cases eliminates the swapping of labels of crossing targets 20, 22 despite the targets 20, 22 having no distinguishable attributes.

The composite flight path process computes a composite flight path for the targets 20, 22 and also computes a polarity value for the targets 20, 22. One particular manner in which the composite flight path value and polarity value may be computed will be described in detail below in conjunction with FIGS. 2–4A. Suffice it here to say that the composite flight path and polarity value computations for the targets 20, 22 provide an additional degree of freedom which allows minimization of a region within which targets cannot be unambiguously correlated thereby minimizing or preventing the occurrences of miscorrelations, track equalization and permanent label swapping while at the same time minimizing the potential for track loss when the targets 20, 22 emerge from the region. Thus, the composite flight path process reduces or prevents the occurrences of target label swaps while at the same time reducing or preventing the occurrences of track losses.

Figure 1A:
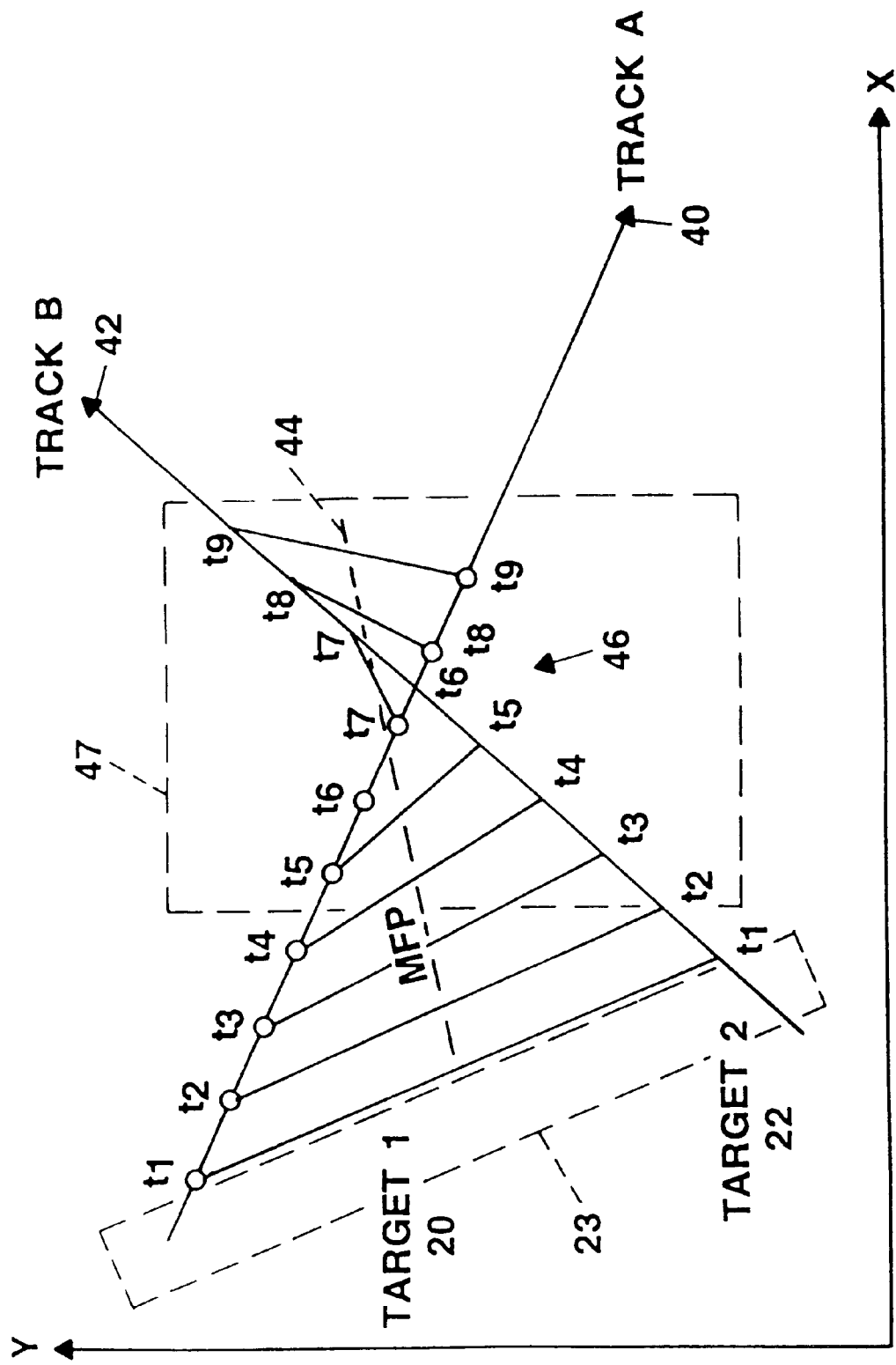
FIG. 1A is a plot showing a pair of crossing targets.
Figure 1B:
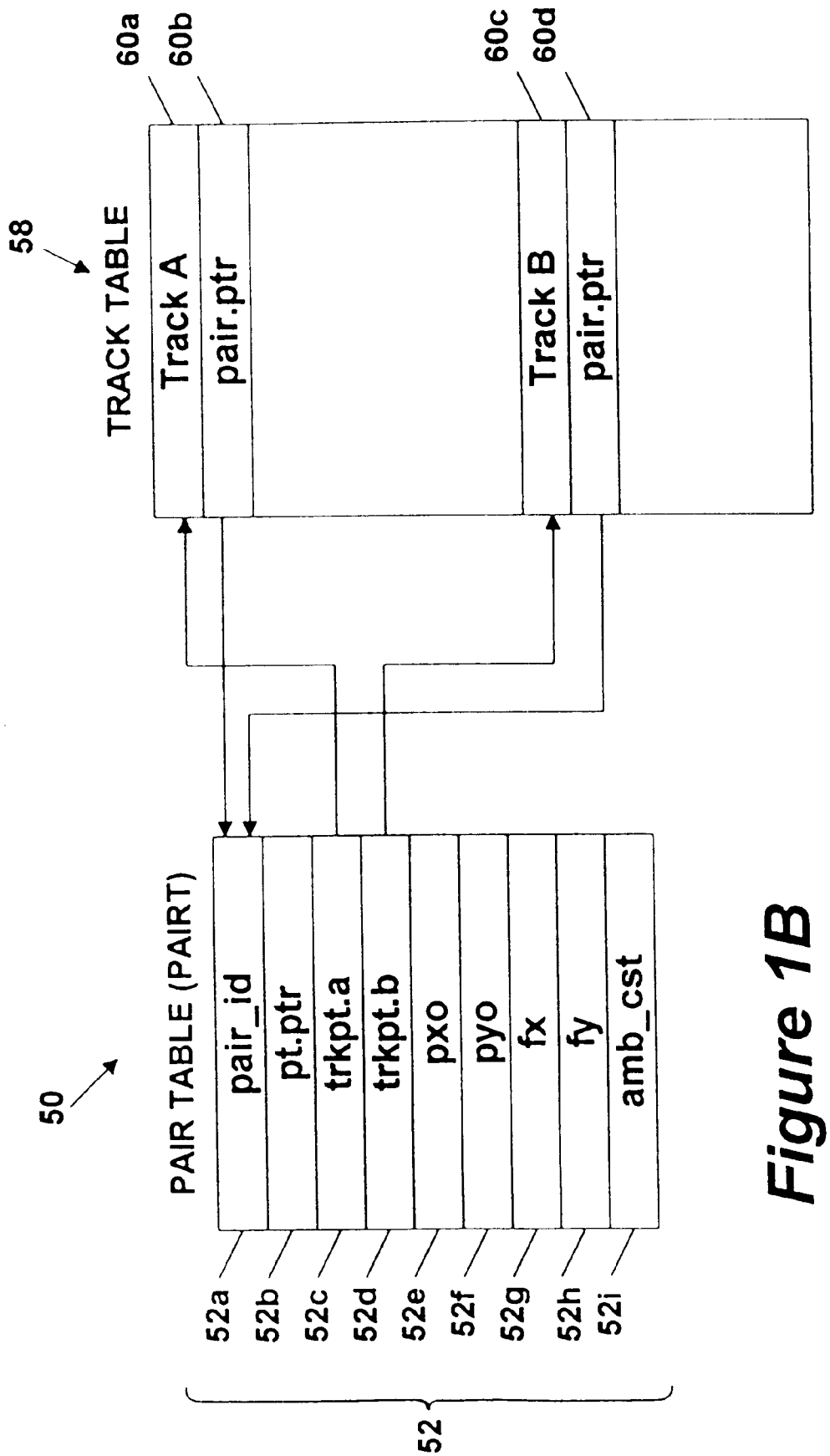
FIG. 1B is a diagram illustrating a Pair Table and a Track Table.

Referring now to FIGS. 1A, 1B in which like elements of FIG. 1 are provided having like reference designations, a target pair 23 formed from targets 20, 22 have respective tracks 40, 42 and a composite flight path 44. As can be seen in FIG. 1A, the tracks 40, 42 cross at a crossing point 46.

The composite flight path 44 is the locus of $(X_m(t), Y_m(t))$ and may be computed as:

$$X_m(t) = (X_1(t) + X_2(t))/D$$

$$Y_m(t) = (Y_1(t) + Y_2(t))/D$$

in which:

$X_m(t)$ corresponds to an x value of the composite flight path at time t;

$Y_m(t)$ corresponds to a y value of the composite flight path at time t;

$X_1(t)$ corresponds to the x value of the ground plane coordinate of target 1 at time t;

$X_2(t)$ corresponds to the x value of the ground plane coordinate of target 2 at time t;

$Y_1(t)$ corresponds to the y value of the ground plane coordinate of target 1 at time t;

$Y_2(t)$ corresponds to the y value of the ground plane coordinate of target 2 at time t; and D corresponds to a predetermined numerical value.

In the description provided herein below, the value of D is selected as a constant value equal to two and thus, the composite flight path corresponds to a mean flight path (i.e. a flight path obtained by averaging the coordinates of the two flight paths). Those of ordinary skill in the art will appreciate, of course, that the composite flight path may be computed using other techniques. For example, the value of D may be selected as an integer or a real number other than two.

It should be noted that the difference between the x value of the mean flight path $X_m$ and the ground plane coordinate of the first target denoted as $X_1$ and the difference between the mean flight path $X_m$ and ground plane coordinate of the second target $X_2$ have opposite signs. Likewise, the difference between the Y value of the mean flight path $Y_m$ and the Y value of the ground plane coordinate for the first target $Y_1$ is of opposite sign to the difference between the mean value $Y_m$ and the ground plane coordinate of the second target $Y_2$. These differences are referred to herein as polarities.

The X polarity of aircraft $T_1$ is thus defined as being positive and that of target $T_2$ is thus defined as being negative if the difference between the mean value $X_m$ and the value of a ground plane coordinate of the first target $X_1$, (i.e. $X_m - X_1$) is positive. Similarly, the Y polarity of target 1 is positive if the difference $Y_m - Y_1$, is positive and vise versa. The polarity indicates a position of each target relative to the mean flight path (i.e. the polarity value indicates on which side of the mean flight path the target is located).

When a target passes the crossing point, its polarity is reversed. Thus, by knowing one target's polarity and whether the target has passed the crossing point, it can be uniquely distinguished from the other target.

The region 47 illustrated in FIG. 1A corresponds to a region within which targets 20, 22 cannot be unambiguously correlated. In conventional systems utilizing the nearest neighbor technique, the region is referred to as an ambiguous crossing region (ACR) defined by the region where search areas overlap. The composite flight path technique of the present invention, on the other hand, does not correlate on the basis of search areas. The ATC system 16 (FIG. 1) receives radar reports at times $t_1, t_2, \ldots t_9$. At time $t_1$, when the targets 20, 22 are still far enough apart to be unambiguously correlated (i.e. outside region 47), but close enough to be within a predetermined threshold distance from each other, the two targets 20, 22 are identified as a target pair 23. Upon identifying the targets 20, 22 as a target pair, the radar data processor 24c (FIG. 1) generates a target pair record and stores the record as part of a target pair table.

Referring briefly to FIG. 1B, a pair table 50 is shown to include a target pair record 52 having a plurality of fields 52a–52i. Here only a single record 52 is shown but in practice, pair table 50 would typically include a plurality of target pair records 52 related as a linked list in pair table 50. The Pair Table 50 is stored in a memory portion of RD processor 24c (FIG. 1) and in one Particular embodiment, the Pair Table 50 is stored in a random access memory of RD processor 24c as a memory-resident Pair Table.

Each target pair record 52 contains a pair identifier 52a (denoted pair), a pointer value 52b (denoted pt.ptr) which points to the next record in the pair table 50, and a pair of pointers 52c, 52d (denoted trkpt.a and trkpt.b) which point to entries in a Track Table 58 and in particular point to the records 60a, 60c in the Track Table 58. The track table records 60a, 60c identify the track data corresponding to the targets in the target pair 23.

Target pair record 52 also includes initial x and y polarity values 52e, 52f (denoted pxo, pyo) of one of the targets 20, 22. In one particular embodiment, the x, y polarity values 52e, 52f correspond to those of the targets 20, 22 relating to the track to which the first pointer 52c (trkpt.a) is Pointing. This convention will be used in the below description. Those of ordinary skill in the art will appreciate of course that other conventions may also be used and that the selection to use the initial x- and y-polarity of one target versus the other target in a target pair is not central to the invention. Once such a selection is made, however, it is important to consistently apply the selected convention to the remaining processing steps.

Target pair record 50 also includes flags for x and y separation 52g, 52h (denoted fx, fy) which indicate whether a minimum separation distance in x and y directions has been maintained between the targets in the target pair 23 and an ambiguous coast termination counter 52i (denoted amb_cst) which is used to ensure that ambiguous coasting is not terminated prematurely.

Referring again to FIGS. 1, 1A, once the targets 20, 22 approach the crossing point 46 it is not possible to rely on signal data received via radar system 12 to correctly correlate each of targets 20, 22 with its track. To determine whether the targets 20, 22 passed the crossing point 46, the composite flight path process executed by the radar data processor 24c (FIG. 1) computes separation values in the x and y directions $D_x$ and $D_y$, respectively, between the targets 20, 22. The separation values $D_x$ and $D_y$, can be computed in accordance with Equations 1, 2 below:

$$D_x(t) = |X_1(t) - X_2(t)| \qquad \text{Equation 1}$$

$$D_y(t) = |Y_1(t) - Y_2(t)| \qquad \text{Equation 2}$$

in which:

$X_1(t)$ corresponds to an x coordinate of a first target (e.g. target 20 in FIG. 1A) at time t;

$X_2(t)$ corresponds to an x coordinate of a second target (e.g. target 22 in FIG. 1A) at time t;

$Y_1(t)$ corresponds to y coordinate of the first target at time t; and $Y_2(t)$ corresponds to a y coordinate of the second target at time t.

As the two targets 20, 22 approach each other, the magnitudes of the separation values $D_x$ and $D_y$ generally decrease until the targets 20, 22 reach the crossing point 46, after which the magnitudes of the separation values $D_x$ and $D_y$ grow. By comparing the magnitudes of the separation values $D_x$ and $D_y$ to predetermined threshold values $TH_x$ and $TH_y$, respectively, and keeping track of whether the magnitudes of the separation values $D_x$ and $D_y$ have ever become less than predetermined threshold values $TH_x$ and $TH_y$, respectively, it can be determined whether at any given time the targets 20, 22 have crossed paths.

Two logical variables or separation flags for the x and y directions denoted $F_x$ and $F_y$ respectively, are used to keep track of whether the magnitudes of the separation values $D_x$ and $D_y$ have ever become less than predetermined threshold values $TH_x$ and $TH_y$, respectively, The separation flags $F_x$, $F_y$ are also saved in the Pair Table fields 52g, 52h as variables fx, fy. The fields 52g, 52h are initially set to indicate that it has not yet been determined that the magnitudes of the separation values $D_x$ and $D_y$ have ever become less than predetermined threshold values $TH_x$ and $TH_y$, respectively. This may be accomplished, for example by setting the values of the separation flag variables $F_x$ $F_y$ to a logical false condition.

When two targets 20, 22 are first defined as the target pair 23, the targets are still separated by a distance such that the separation values $D_x$, $D_y$ are greater than the respective separation threshold values $TH_x$, $TH_y$ (i.e. $D_x \geq TH_x$ and $D_y \geq TH_y$). As the targets 20, 22 close range, one or both of the separation values $D_x$, $D_y$ will decrease to a point at which the magnitude thereof is less than the magnitude of the respective separation threshold values $TH_x$, $TH_y$ thus indicating that the separation values have entered their crossing regions, defined by $D_x < TH_x$ and $D_y < TH_y$, respectively.

The first time each threshold is crossed, a corresponding one of the threshold crossing indicator flags $F_x$, $F_y$ is set to indicate such. For example, the indicator value may change from a logical false to a logical true. The value of the flag is maintained at the changed value for the remaining life of the target pair 23. Thus, with this approach, for a finite time before and after the targets 20, 22 cross, the separation values $D_x$ or $D_y$ exceeds its respective threshold; and by examining the corresponding flag $F_x$, $F_y$ in conjunction with a corresponding polarity values of the targets 20, 22, each of the targets 20, 22 can be correctly correlated with its track without using a search area. Accordingly, the size of the search areas can selected solely to avoid track loss.

Thus a target/track correlation is made on the basis of three conditions: (1) polarity; (2) separation; and (3) the state of a threshold crossing indicator (e.g. flags $F_x$, $F_y$). The possible values for each of these conditions and the resulting decision based on the values can be tabulated in a decision table. Accordingly, in Decision Table below accounts for all combinations of these conditions and resultant correlations.

The decision table is composed of four parts: X-Component, Y-Component, Auxiliary Conditions, and Decision. The X-Component includes a set of three logical parameters associated with the x-coordinates of the target's position. Likewise, the Y-Component has a set of three logical parameters associated with the y-coordinates. Each trio corresponds to the three aforementioned conditions of polarity, separation, and flag. By examining the parameter set of the X- and Y-Components, an unambiguous correlation can be made in all but five cases (Nos. 3, 5, 13, 14, and 18). In two of these cases Nos. 13 and 18), additional conditions must be evaluated, and these are included in the Table's Auxiliary Conditions (Aux.) column. The remaining three cases (Nos. 3, 5, and 14) call for ambiguous coasting. The fourth part is the correlation decision, which can have one of the following three outcomes:

A=Associate the target with Track A

B=Associate the target with Track B

C=Indeterminate; switch to, or maintain, ambiguous coasting.

| | X-Component | | | Y-Component | | | | Decision |
|---|---|---|---|---|---|---|---|---|
| Case | Polarity $P_x$ = pxo | Sep $D_x \geq TH_x$ | Flag $F_x$ | Polarity $P_y$ = pyo | Sep. $D_y \geq TH_y$ | Flag $F_y$ | Aux. | Associate Target with Track... |
| 1 | T | — | F | T | — | F | | A |
| 2 | — | — | T | T | — | F | | A |
| 3 | F | — | F | T | — | F | | C |
| 4 | T | — | F | — | F | T | | A |
| 5 | — | F | T | — | F | T | | C |
| 6 | T | T | T | — | F | T | | B |
| 7 | F | — | F | — | F | T | | B |
| 8 | F | T | T | — | F | T | | A |
| 9 | T | — | F | — | T | T | | A |
| 10 | — | F | T | T | T | T | | B |
| 11 | T | T | T | T | T | T | | B |
| 12 | F | — | F | — | T | T | | B |
| 13 | F | T | T | T | T | T | $D_x > D_y$ $D_x < D_y$ $D_x = D_y$ | A B C |
| 14 | T | — | F | F | — | F | | C |
| 15 | — | — | T | F | — | F | | B |
| 16 | F | — | F | F | — | F | | B |
| 17 | — | F | T | F | T | T | $D_x > D_y$ | A B |

-continued

| | X-Component | | | Y-Component | | | | Decision |
|---|---|---|---|---|---|---|---|---|
| Case | Polarity $P_x = pxo$ | Sep $D_x \geq TH_x$ | Flag $F_x$ | Polarity $P_y = pyo$ | Sep. $D_y \geq TH_y$ | Flag $F_y$ | Aux. | Associate Target with Track... |
| 18 | T | T | T | F | T | T | $D_x < D_y$ $D_x = D_y$ | A C |
| 19 | F | T | T | F | T | T | | A |

To provide for a "clean" (non-oscillatory) transition between ambiguous coasting and composite flight path correlation, the former is terminated only after the composite flight path process can produce three consecutive composite flight path correlations (denoted by A or B in the right most column of the Decision Table). This count is maintained by the ambiguous coast termination counter, which is set to zero whenever the technique switches to ambiguous coasting, and is incremented by one whenever the technique produces a composite flight path correlation. The count of three provides a threshold to ensure that ambiguous coasting is not terminated prematurely. The count is kept in the Pair Table 50 (FIG. 1B) in field 52i in the variable denoted amb_cst.

To illustrate the use of the decision table, consider the case depicted in FIG. 1A.

At time $t_1$, the polarities are computed and associated with tracks. The positive x-polarity and negative y-polarity of Target 20 (Target 1 or $T_1$) are associated with Track A. These are the initial polarities which are denoted by pxo and pyo, respectively. At time $t_1$, entry no. 1 of the table applies to Target 20 and entry no. 16 to Target 22 (Target 2 or $T_2$), by definition. At time $t_2$, one of the targets is selected and its polarities $(P_x,P_y)$ and separations $(D_x,D_y)$ are computed. If entry 1 applies, the target is correlated with Track A; otherwise, if entry 16 applies, the target is correlated with Track B. This process continues until, at time $t_6$, $D_y$ falls below its threshold, $TH_y$, while $D_x$ remains above $TH_x$. $F_y$ now becomes true, while $F_x$ remains false. For Target 1, entry no. 4 will now apply, with entry no. 7 applying to Target 2. At time $t_7$, $D_x$ also falls below threshold and $F_x$ becomes true. The two targets are now too close to resolve unambiguously, and the algorithm is directed by table entry no. 5 to switch to ambiguous coasting. At $t_8$, $D_y$ rises above its threshold, but $D_x$ still remains in the crossing region. Both $F_x$ and $F_y$ are true, and the algorithm moves to entry 10 or 17. At $t_9$, $D_x$ emerges from the crossing region. If either entry 11 or 19 is found to apply, a composite flight path correlation can be readily made. However, if entry 13 or 18 applies, the auxiliary condition must be checked first. The latter entries apply mostly in the vicinity of the crossing region. As the targets continue to separate, entries 11 and 19 will determine the type of correlation.

Referring now to FIGS. 1B–1E, a series of plots illustrating different possible flight paths and conditions which give rise to the ambiguity problem are shown. The composite flight path techniques described herein minimze or eliminate target swapping and track loss for each of the flight paths shown as well as variants thereof.

FIGS. 2–5A are a series of flow diagrams showing the processing performed by the radar data processor 24c provided as part of air traffic control automation system 10 (FIG. 1) to compute composite flight paths, polarity values and ambiguous coast values for crossing targets. The rectangular elements (typified by element 80 in FIG. 2), herein denoted "processing blocks," represent computer software instructions or groups of instructions. The diamond shaped elements (typified by element 90 in FIG. 2), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 2:
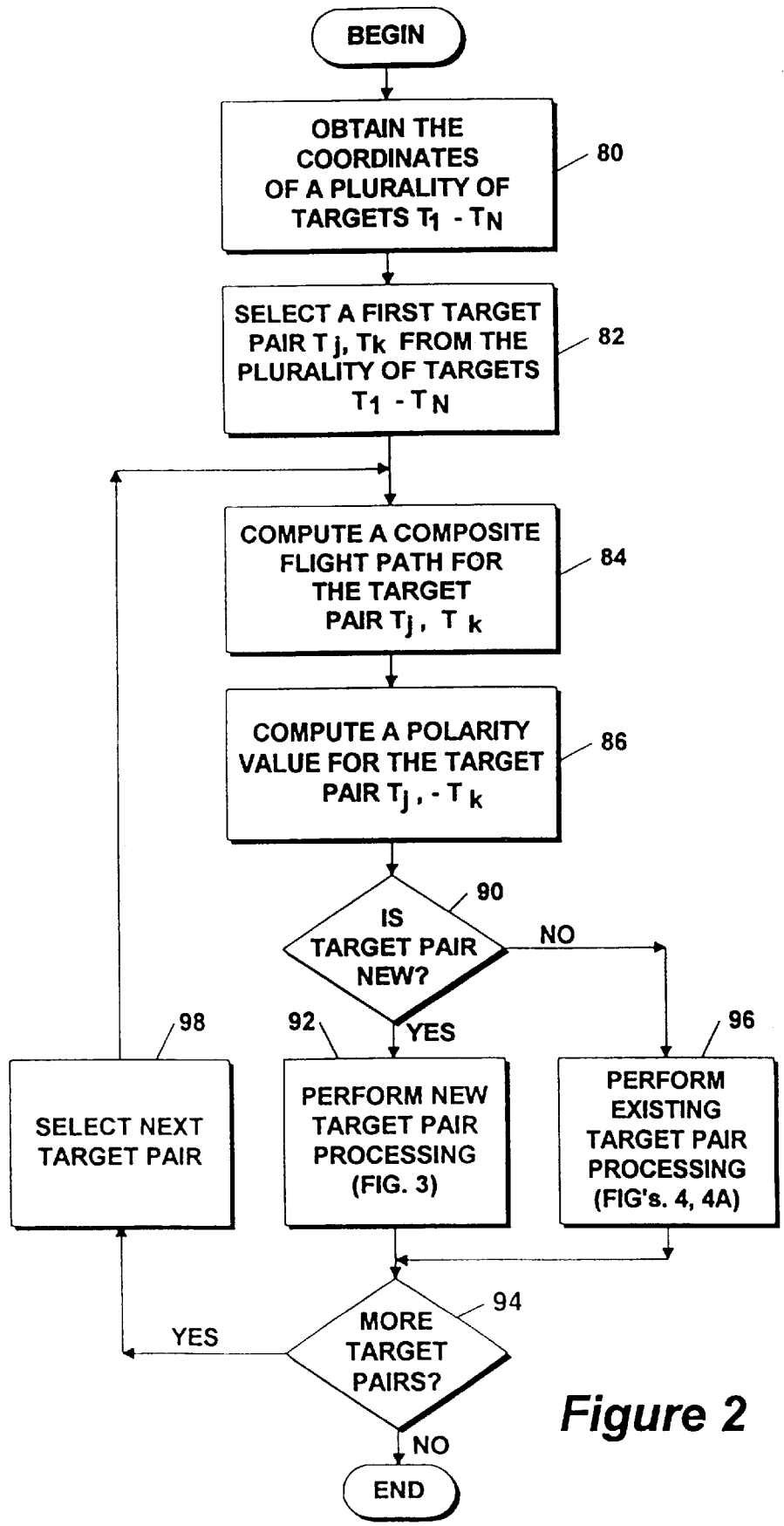
FIG. 2, is a flow diagram of a set of processing steps which takes place to process information of crossing targets.

Turning now to FIG. 2, the processing performed to track a target through an ambiguous correlation region begins with step 80 in which the coordinates of a plurality of targets $T_1$–$T_N$ are obtained. Processing then proceeds to step 82 in which a first target pair $T_j,T_k$ are selected from the plurality of targets $T_1$–$T_N$. Next, a composite flight path for the target pair $T_j,T_k$ is computed as shown in step 84 and a polarity value for the target pair 23 is computed in step 86. The composite flight path and polarity values may be computed as discussed above in connection with FIGS. 1–1B.

Processing then flows to decision block 90 in which a determination is made as to whether the target pair is a new target pair (i.e. a target pair which has not been previously identified) or an existing pair. If decision is made that the target pair is a new target pair then processing flows to step 92 where new target pair processing is performed. The particular steps involved in processing a new target pair are described below in conjunction with FIG. 3.

If on the other hand, a decision is made that the target is an existing target pair, then processing flows to processing step 96 in which existing target pair processing is performed. The particular steps involved in existing target pair processing is described below in conjunction with FIGS. 4, 4A. In general overview, existing pair processing correlates each of the first and second targets with a corresponding one of the first and second track data in response to the values of a polarity indicator, a separation indicator and a crossing region indicator.

After the appropriate processing has been performed in either step 92 or 96, processing flows to decision block 94 where a determination is made as to whether more target pairs exist. If no target pairs exist which have not yet been processed, then processing ends. If on the other hand, target pairs exist which have not yet been processed, then processing flows to step 98 where a next target pair is selected and steps 84–96 are repeated until all target pairs are processed.

Figure 3:
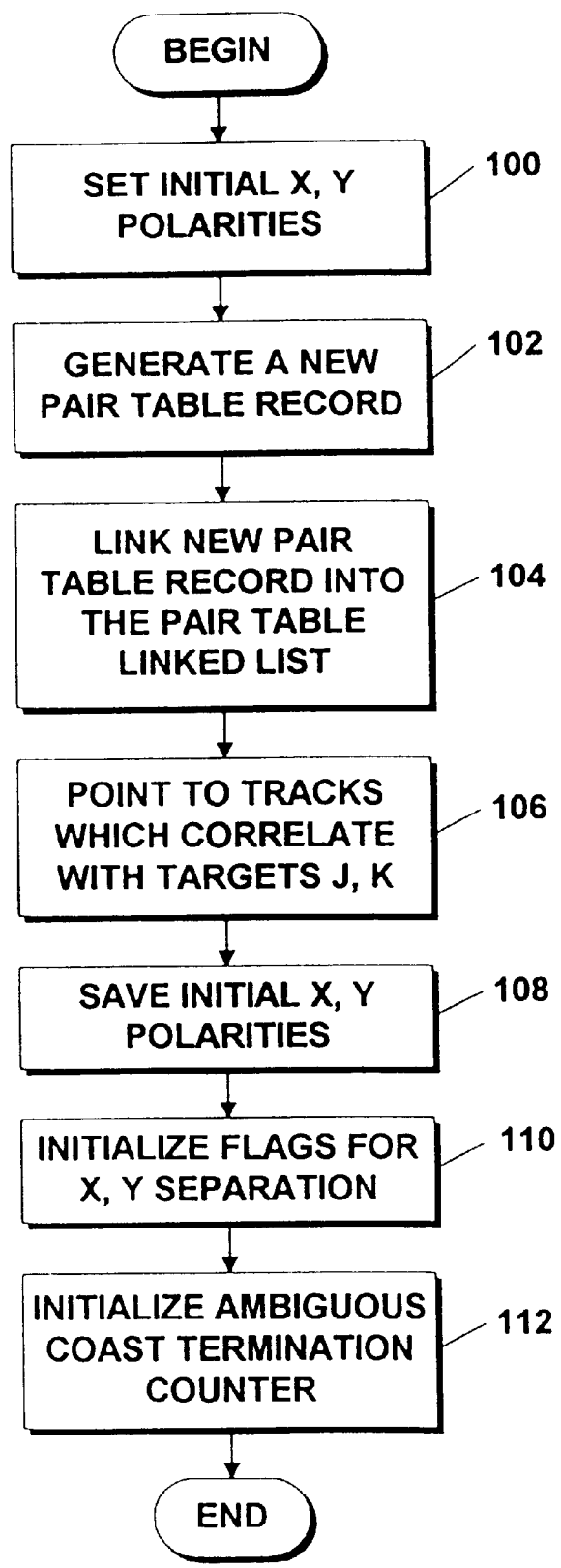
FIG. 3 is a flow diagram showing the processing which takes place to process information for a new target pair.

Referring now to FIG. 3, the processing performed to process radar data for a new target pair begins in step 100 where the initial x and y polarities for the target pair are set to predetermined values. Processing then flows to step 102 where a new pair table record for the new target pair is generated.

Next, in the case where the pair table is provided as a linked list, the new pair table record is linked into the pair table list. The new pair table record may be linked to the pair table via pointers as described above in conjunction with FIG. 1B, or via any other technique well known to those of ordinary skill in the art. In the case where the pair table is not provided as a linked list, this step may be omitted and any other method known to one of ordinary skill in the art may be used to include the new pair table record in the pair table.

Processing then proceeds to step 106 in which the new pair table record is related to an appropriate entry in the track table. This may be accomplished, for example, by establishing a pointer in the pair table to the particular tracks which correlates with the targets in the target pair and including in the track table a pair of pointers which point to a target pair identifier provided in the pair table as illustrated in FIG. 1B. Those of ordinary skill in the art will appreciate, of course, that a variety of different techniques may be used to relate the pair table records to the track table records and that selection of any particular technique is functionally equivalent to the implementation herein described.

The initial x and y polarity values are then saved for later processing. Processing then flows to steps 110 and 112 where the flags for x and y separation and the ambiguous coast termination counter are initialized to predetermined values. New target pair processing then ends.

Figure 4:
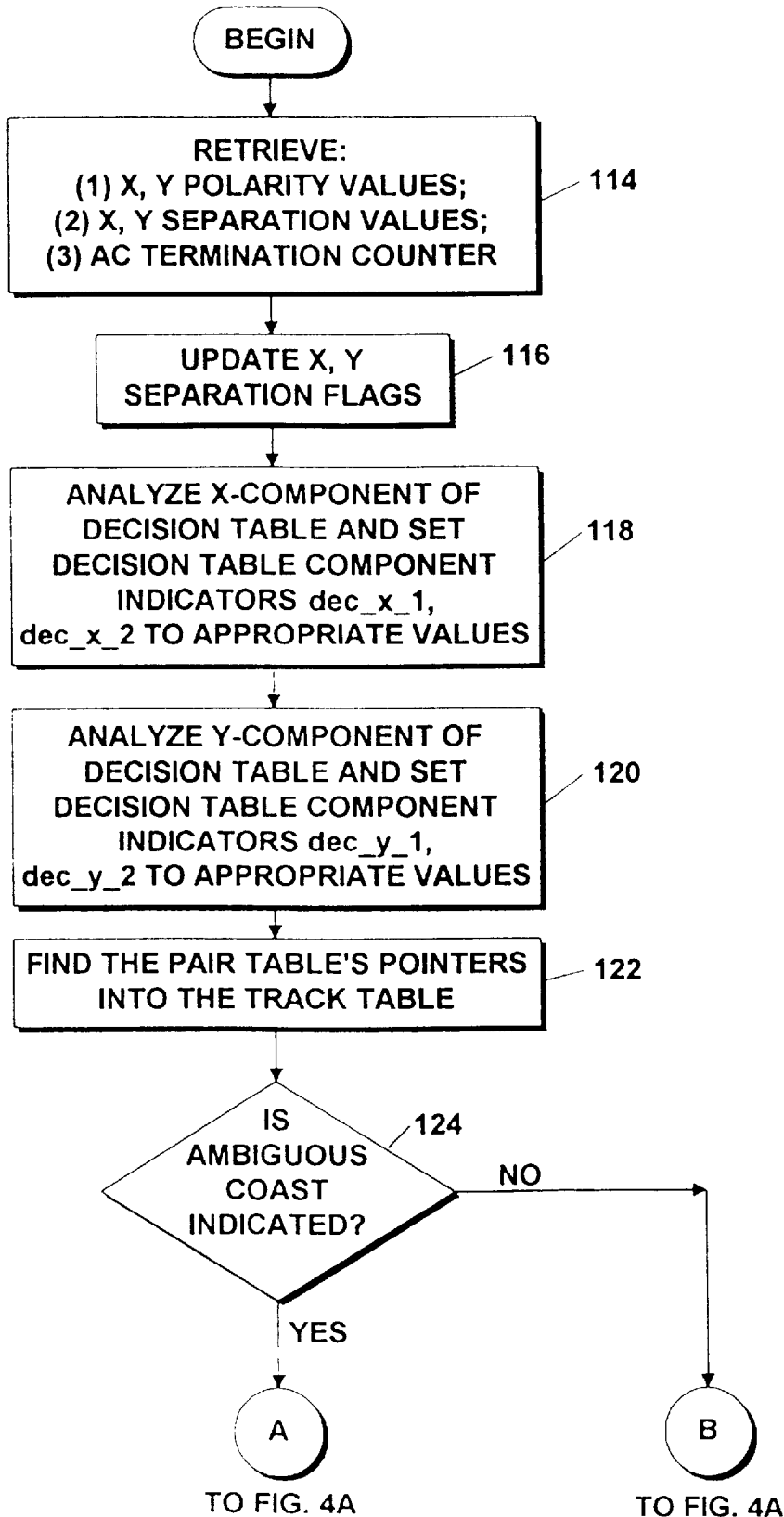
FIGS. 4, 4A are a series of flow diagrams showing the processing which takes place to process information for an established pair of targets.
Figure 4A:
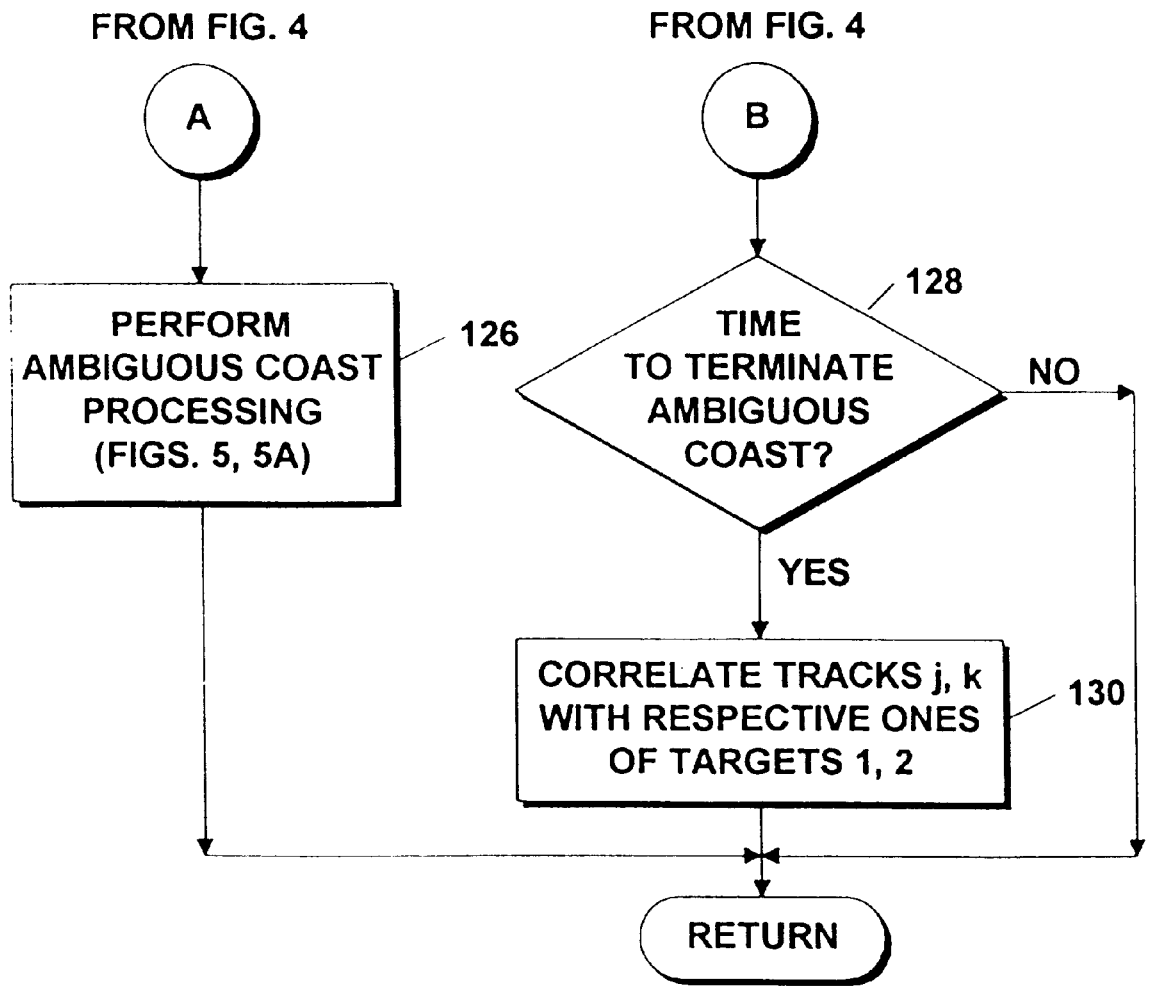

Referring now to FIGS. 4, 4A, a series of flow diagrams showing the processing which takes place to process information for an established target pair begins with step 114 in which x and y polarity values, x and y separation values, and the ambiguous coast termination counter values are retrieved from the appropriate record of the pair table. Processing then proceeds to step 116 in which x and y separation flags are updated based upon the retrieved values. Processing then proceeds to step 118 in which the x component of the decision table is analyzed and the decision table component indicators dec_x_1, and dec_x_2, are set to appropriate values. The particular values to which the component indicators are set is established via the existing conditions at that time. All possible conditions are presented in the decision table described above.

Processing then proceeds to step 120 in which the y component of the decision table is analyzed and the component indicators dec_y_1, dec_y_2, are set to appropriate values. Processing then proceeds to step 122 where the pointers for the particular target pair being processed are located to thus allow the correct entries in the track table to be identified.

Processing then proceeds to decision block 124 where a determination is made as to whether ambiguous coast is indicated. If ambiguous coast is indicated, then processing proceeds to processing block 126 where an ambiguous coast technique is performed. The ambiguous coast technique will be described in detail below in conjunction with FIGS. 5, 5A.

If in decision block 124 decision is made that ambiguous coast is not indicated, then processing proceeds to decision block 128 where a decision is made as to whether ambiguous coast should be terminated. If in decision block 128 decision is made that ambiguous coast should be terminated, then processing proceeds to processing step 130 where the tracks are correlated with respective ones of the targets 1, 2. Processing then returns to the appropriate step in the composite flight path process.

Figure 5:
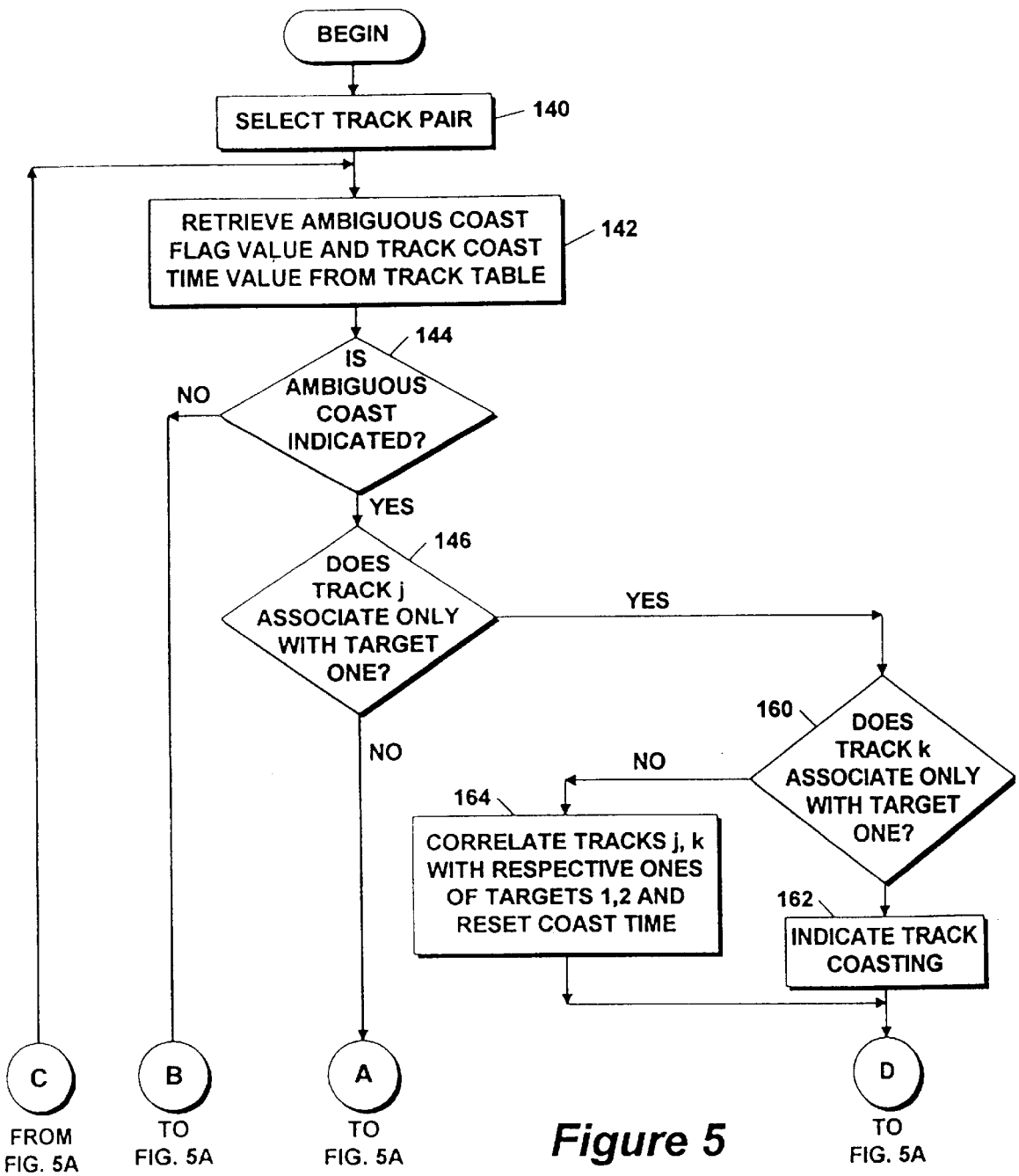
FIGS. 5, 5A are a series of flow diagrams showing the processing which takes place in ambiguous coast processing.
Figure 5A:
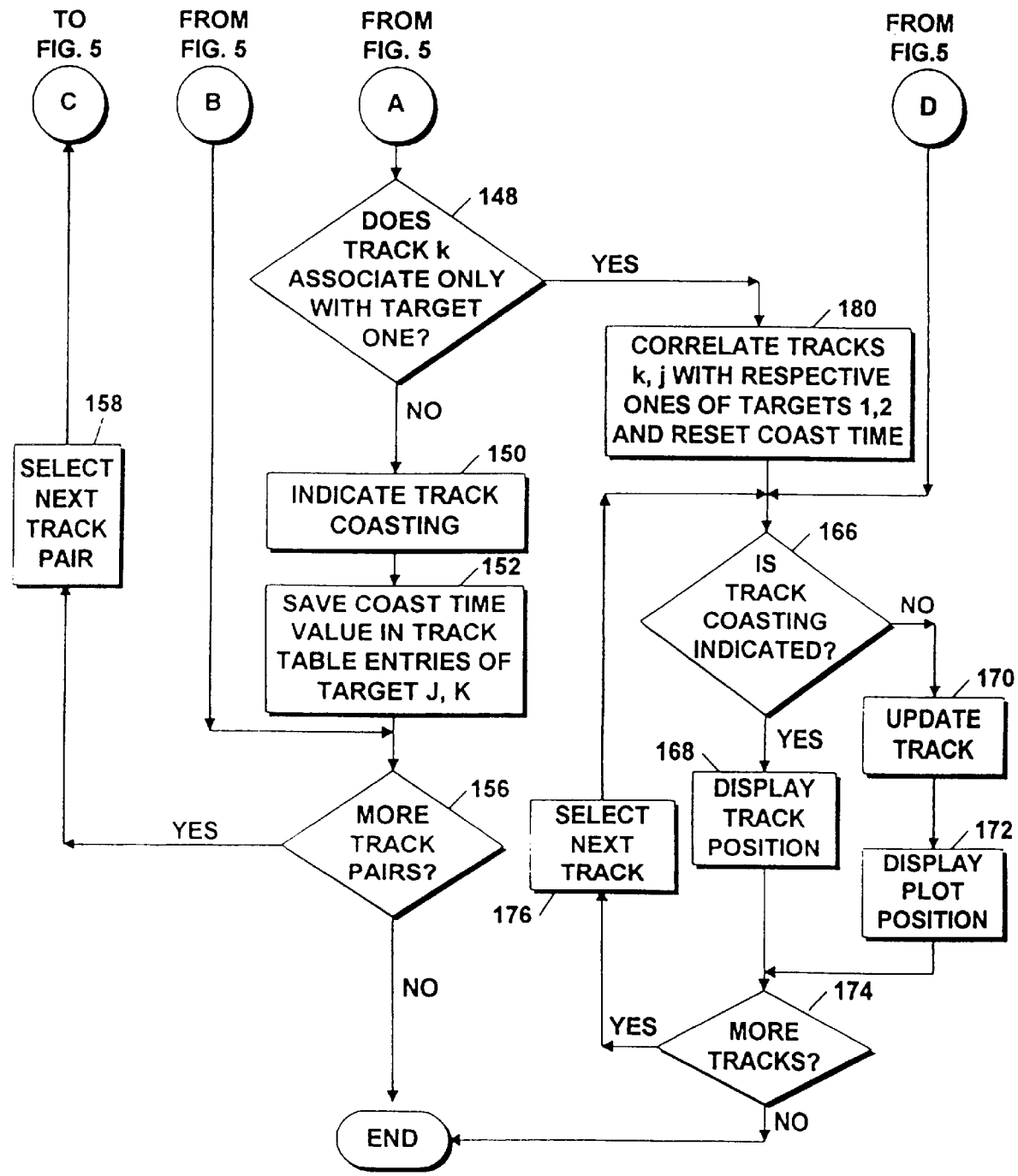

Referring now to FIGS. 5, 5A, a flow diagram showing the processing performed for ambiguous coasting is shown. Before describing the processing steps in detail, some background information is first provided.

In the crossing region, correlation can be: (1) ambiguous, or (2) unambiguous and correct, or (3) unambiguous but incorrect. Correlation is ambiguous if both targets are located in one or both search areas. Correlation is unambiguous if at least one of the search areas contains only one of the targets, in which case the correlation is either correct or incorrect. The probability of incorrect correlation and track swap increases as the search areas approach each other.

While the composite flight path technique described above in conjunction with FIGS. 1–4A ensures that crossing targets will be correctly correlated after they have emerged from the crossing region, in accordance with a further aspect of the present invention, swaps within the crossing region can be avoided by coasting the targets. Such coasting is referred to hereinbelow as an ambiguous coasting technique so as to distinguish the process from conventional coasting techniques.

Briefly, the purpose of conventional coasting techniques is to estimate the position of an aircraft in the absence of detection.

The purpose of the ambiguous coasting technique of the present invention, on the other hand, is to minimize or prevent label swaps and sidestep miscorrelations that can lead to track loss.

In general overview, ambiguous coasting works as follows. When the composite flight path technique produces an indeterminate result (denoted by C in the right most column of the Decision Table), the system suppresses the display of the pair's plots and, instead, displays their track positions, tagged by labels showing the aircraft identification labels (IDs) retrieved from the Track Table. The tracks themselves are coasted only if both targets fall into the same search area. Otherwise, the tracks are updated, even though the correlation can be incorrect. This scheme minimizes the number of consecutive instances in which the tracks are not updated, and thereby prevents the track from veering too far off course. This is of particular importance in certain scenarios which take a long time to traverse the crossing region. For example, when one target overtakes another by only 100 knots, and the search areas are one nautical mile in radius, the areas will overlap for 144 seconds.

Turning now to FIGS. 5, 5A, ambiguous coast processing begins by selecting a track pair as shown in step 140. Processing then flows to step 142 in which an ambiguous coast flag value and track coast time value are retrieved from the appropriate entry for the target pair in the track table. Processing then flows to decision block 144 where a determination is made as to whether ambiguous coast is indicated. If ambiguous coast is indicated, then processing proceeds to decision block 146 where a decision is made as to whether a first one of the tracks (e.g. track j) is associated only with target 1. If track j is not associated only with target 1, then processing proceeds to decision block 148 where decision is made as to whether track k is associated only with target 1.

If in decision block 148 decision is made that track k is not associated only with target 1 then an indication of track coasting is made as shown in step 150. Processing then proceeds to step 152 in which the coast time value in the track table entries of targets j and k is saved. Processing then proceeds to decision block 156 where a determination is made as to whether more track pairs should be processed. If in decision block 156 no track pairs should be processed, then processing ends as shown. If on the other hand, more track pairs should be processed, then processing proceeds to step 158 where a next track pair is selected and processing flows back to step 142.

In decision block 146, if decision is made that track j is associated only with target 1, then processing flows to decision block 160 where a determination is made as to whether track k is associated only with target 1. If track k is associated only with target 1, then processing proceeds to step 162 where an indication of track coasting is made. If on the other hand, decision is made that track k is not associated only with target 1, then processing proceeds to step 164 where a correlation of tracks j,k is made with respective ones of targets 1 and 2 and the coast time is reset.

After performing the appropriate one of steps 162, 164, processing proceeds to decision block 166 where a determination is made as to whether track coasting is indicated. If track coasting is indicated, then the track position is displayed as shown in step 168. If on the other hand, decision is made that track coasting is not indicated, then processing flows to processing block 170, 172 where the track is updated and the plot position is displayed. Processing then flows to decision block 174 where a determination is made as to whether more tracks should be processed. If no more tracks should be processed, then processing ends as shown. If on the other hand, more tracks should be processed, then processing flows to the step 176 where a next track is selected and steps 166–174 are repeated.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks or other communication networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for tracking a pair of approaching targets comprising the steps of:

(a) obtaining the coordinates of a plurality of targets;

(b) selecting a first target pair from the plurality of targets;

(c) computing a composite flight path value for the target pair;

(d) computing a polarity value for the target pair; and (e) using the composite flight path and the polarity values to correlate the targets with their tracks if the targets cross.

2. The method of claim 1 further comprising the steps of:

(f) determining if the target pair is a new target pair;

(g) in response to the target pair being a new target pair, performing new target pair processing including the step of initializing a new record in a pair table; and (h) in response to the target pair not being a new target pair, performing established target pair processing including the step of analyzing a decision table to determine if one of the targets in the target pair is in the crossing region and if ambiguous coast processing should be performed.

3. The method of claim 1 further comprising the steps of:

(f) selecting a next target pair from the plurality of targets;

(g) repeating steps (c)–(e) for the next target pair; and (h) repeating steps (f) and (g) for a plurality of different target pairs.

4. The method of claim 1 further comprising the steps of:

(f) selecting a next target pair from the plurality of targets; and (g) repeating steps (c)–(e) for a plurality of different target pairs.

5. The method of claim 1 wherein the step of computing the composite flight path includes the steps of:

(c1) adding a first flight path coordinate of a first target to a first flight path coordinate of a second target to provide a first coordinate sum;

(c2) dividing the first coordinate sum by a predetermined value to provide a first composite value;

(c3) adding a second flight path coordinate of the first target to a second flight path coordinate of the second target to provide a second coordinate sum; and (c4) dividing the second coordinate sum by a predetermined value to provide a second composite value.

6. The method of claim 5 wherein the step of computing a polarity value for the target pair includes the steps of:

(d1) subtracting a first flight path coordinate of a first target from the first composite coordinate value to provide a first polarity value; and (d2) subtracting a second flight path coordinate of the first target from the first composite coordinate value to provide a second polarity value.

7. The method of claim 2 wherein the step of performing new target pair processing includes the steps of:

(g1) setting initial x, y polarity values;

(g2) generating a new pair table record;

(g3) linking the new pair table record into the pair table link list;

(g4) relating the pair table record to first and second track table entries corresponding to the track table entries for the targets in the target pair;

(g5) initializing first and second separation flags; and (g6) initializing an ambiguous coast termination counter.

8. The method of claim 2 wherein the step of performing established target pair processing includes the steps of:

(h1) retrieving first and second plurality values, first and second separation values and an ambiguous coast termination counter;

(h2) updating the value of first and second separation flags;

(h3) analyzing an x component of the decision table and setting a decision table component indicator to an appropriate value;

(h4) analyzing a y component of the decision table and setting the decision table component indicator to an appropriate value;

(h5) determining if ambiguous coast is indicated;

(h6) in response to ambiguous coast being indicated performing ambiguous coast processing; and (h7) in response to ambiguous coast not being indicated, determining if ambiguous coast should be terminated.

9. The method of claim 1 wherein after step (b) the method comprises the step of determining if a composite flight path should be computed for the target pair selected in step (b).

10. The method of claim 9 wherein the step of determining if the composite flight path should be computed comprises the steps of:

computing a separation value between the target pair; and comparing the separation value to a predetermined threshold value.

11. The method of claim 10 wherein the step of computing a separation value includes the steps of:

computing a first separation value corresponding to an x separation between the target pair;

computing a second separation value corresponding to a y separation between the target pair;

comparing the first separation value to the second separation value; and comparing the smaller of the first and second separation values to a predetermined threshold distance value.

12. The method of claim 11 further comprising the steps of:

in response to the smaller of the first and second separation values not being less than the predetermined threshold distance value, indicating that the mean flight path should be computed for the target pair; and in response to the smaller of the first and second separation values being less than the predetermined threshold distance value, indicating that the mean flight path should not be computed for the target pair.

13. An apparatus for tracking a pair of approaching targets comprising:

(a) means for obtaining the coordinates of a plurality of targets;

(b) means for selecting a first target pair from the plurality of targets;

(c) means for computing a composite flight path value for the target pair;

(d) means for computing a polarity value for the target pair; and (e) means for using the composite flight path and the polarity values to determine if the targets cross.

14. The apparatus of claim 13 further comprising:

(f) means for determining if the target pair is a new target pair;

(g) means, responsive to the target pair being a new target pair, for performing new target pair processing including the step of initializing a new record in a pair table; and (h) means, responsive to the target pair not being a new target pair, for performing established target pair processing including the step of analyzing a decision table to determine if one of the targets in the target pair is in the crossing region and if ambiguous coast processing should be performed.

15. The apparatus of claim 14 further comprising means for selecting a next target pair from the plurality of targets.

16. The apparatus of claim 15 wherein the means for computing the composite flight path includes:

(c1) means for adding a first flight path coordinate of a first target to a first flight path coordinate of a second target to provide a first coordinate sum;

(c2) means for dividing the first coordinate sum by a predetermined value to provide a first composite value;

(c3) means for adding a second flight path coordinate of the first target to a second flight path coordinate of the second target to provide a second coordinate sum; and (c4) means for dividing the second coordinate sum by a predetermined value to provide a second composite value.

17. The apparatus of claim 16 wherein the means for computing a polarity value for the target pair includes:

(d1) means for subtracting a first flight path coordinate of a first target from the first composite coordinate value to provide a first polarity value; and (d2) means for subtracting a second flight path coordinate of the first target from the first composite coordinate value to provide a second polarity value.

18. The apparatus of claim 17 wherein said means for performing new target pair processing includes:

means for initializing x, y polarity values;

means for generating a new pair table record;

means for linking the new pair table record into the pair table link list;

means for relating the pair table record to first and second track table entries;

means for initializing first and second separation flags; and means for initializing an ambiguous coast termination counter.

19. The apparatus of claim 18 wherein the means for performing established target pair processing includes:

means for retrieving first and second polarity values, first and second separation values and an ambiguous coast termination counter from storage device;

means for updating the value of first and second separation flags;

means for analyzing the x component of the decision table and setting a decision table component indicator to an appropriate value;

means for analyzing a y component of the decision table and setting the decision table component indicator to an appropriate value;

means for determining if ambiguous coast is indicated;

means, responsive to said means for determining if ambiguous coast is indicated, for performing ambiguous coast processing in response to ambiguous coast being indicated and for updating a track at an appropriate time by correlating the target with the corresponding record in the pair table in response to ambiguous coast not being indicated by said means for determining if ambiguous coast is indicated.

20. The apparatus of claim 19 further comprising means for determining if a composite flight path should be computed for the target pair selected by said means for selecting a target pair.

21. The apparatus of claim 20 wherein the means for determining if the composite flight path should be computed comprises:

means for computing a separation value between the target pair; and a first comparator for comparing the separation value to a predetermined threshold value.

22. The apparatus of claim 21 wherein said means for computing a separation value includes:
- means for computing a first separation value corresponding to an x separation between the target pair;
- means for computing a second separation value corresponding to a y separation between the target pair;
- means for comparing the first separation value to the second separation value; and
- means for comparing the smaller of the first and second separation values to a predetermined threshold distance value.

23. The apparatus of claim 22 further comprising means, responsive to the smaller of the first and second separation values, for indicating that the composite flight path should be computed for the target pair in response to the smaller value being less than the predetermined threshold distance value and for indicating that the mean flight path should not be computed for the target pair in response to the smaller of the first and second separation values not being less than the predetermined threshold distance value.

24. An air traffic control system comprising:
- a radar system;
- a radar data processor coupled to said radar system, said radar data processor including:
- a target pair processor for receiving data from said radar system;
- a target pair generator coupled to said target pair processor;
- a composite flight path generator coupled to said target pair processor;
- a polarity identifier coupled to said target pair processor;
- a separation identifier coupled to said target pair processor; and
- a crossing region identifier coupled to said target pair processor.

25. The air traffic control system of claim 24 further comprising an ambiguous coast processor coupled to said target pair processor.

26. The air traffic control system of claim 25 further comprising:
- a pair table having a plurality of records each of the records having a plurality of fields with a first one of the fields corresponding to a pair identification field, a track pointer field, a polarity field, a crossing region indicator field and an ambiguous coast field; and
- a track table having a plurality of records each of the records having a plurality of fields with a first one of the fields corresponding to a track data field and a second one of the fields corresponding to a pair table pointer field.

27. A method for tracking two approaching objects comprising the steps of:
- (a) receiving one or more radar reports identifying a plurality of targets;
- (b) unambiguously correlating first and second targets of the plurality of targets identified in the one or more radar reports with respective ones of first and second track data;
- (c) identifying the targets as a target pair;
- (d) computing a composite flight path of the target pair;
- (e) computing a polarity indicator for each of the first and second targets in the target pair;
- (f) computing a separation value for the first and second targets in the target pair;
- (g) comparing the separation value to a predetermined threshold value;
- (h) setting a separation indicator to a first one of first and second values in response to the comparison step indicating whether the separation value is less than the predetermined threshold value;
- (i) setting a crossing region indicator to a first value indicating whether the target pair has entered a crossing region; and
- (j) correlating each of the first and second targets with a corresponding one of the first and second track data in response to the values of the polarity indicator, the separation indicator and the crossing region indicator.

28. The method of claim 27 wherein the step of correlating each of the first and second targets with a corresponding one of the first and second track data includes the steps of:
- entering data into a target pair table; and
- relating the data in the target pair table to data in a track table.

29. The method of claim 28 wherein the step of correlating each of the first and second targets with a corresponding one of the first and second track data includes the steps of utilizing a decision table to determine if ambiguous coast processing should be performed.

30. A method for ambiguous coasting comprising the steps of:
- (a) performing a first one of: (1) not correlating a target with a track and (2) correlating a target with a track;
- (b) in response to correlating a target with a track, performing the step of updating the track corresponding to the track utilized in step (a); and
- (c) in response to not correlating a target with a track, performing the step of displaying target movement by extrapolating a target position utilizing a target speed and course.

* * * * *